US011164280B2

(12) United States Patent
Jin et al.

(10) Patent No.: US 11,164,280 B2
(45) Date of Patent: Nov. 2, 2021

(54) GRAPHICS LAYER PROCESSING IN A MULTIPLE OPERATING SYSTEMS FRAMEWORK

(71) Applicant: BANMA ZHIXING NETWORK (HONGKONG) CO., LIMITED, Kowloon (HK)

(72) Inventors: Decai Jin, Hangzhou (CN); Zhuojun Jin, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/714,074

(22) Filed: Dec. 13, 2019

(65) Prior Publication Data

US 2020/0193556 A1 Jun. 18, 2020

Related U.S. Application Data

(63) Continuation-in-part of application No. PCT/CN2018/092625, filed on Jun. 25, 2018.

(30) Foreign Application Priority Data

Jul. 7, 2017 (CN) ......................... 201710551288.5

(51) Int. Cl.

*G09G 5/00* (2006.01)
*G06T 1/20* (2006.01)
*G06F 9/54* (2006.01)

(52) U.S. Cl.

CPC ................ *G06T 1/20* (2013.01); *G06F 9/544* (2013.01)

(58) Field of Classification Search

CPC ...... G06F 9/451; G06F 9/452; G06F 9/45537; G06F 3/0481; G06F 9/541; G09G 5/377;

(Continued)

(56) References Cited

U.S. PATENT DOCUMENTS 7,996,785 B2 8/2011 Neil
8,059,137 B2 11/2011 Hanggie (Continued)

FOREIGN PATENT DOCUMENTS

CN 101820524 9/2010
CN 103927222 7/2014
CN 106201398 12/2016

*Primary Examiner* — Hau H Nguyen

(74) *Attorney, Agent, or Firm* — Van Pelt, Yi & James LLP

(57) ABSTRACT

Graphics layer processing in a multiple operating systems framework is disclosed, including: presenting, at a display, a first composition including a sub-graphics layer object associated with a graphical interface corresponding to an application, wherein the application is executed in a guest subsystem of a system; receiving a content-related compositing request corresponding to a guest server graphics layer object in the guest subsystem; using the guest server graphics layer object to obtain a host server graphics layer object that corresponds to the guest server graphics layer object, wherein the host server graphics layer object is in a host subsystem of the system; obtaining a buffer corresponding to the guest server graphics layer object; and generating a second composition including the sub-graphics layer object, wherein the second composition is to be presented at the display.

19 Claims, 10 Drawing Sheets

100

Host Subsystem

Guest Subsystem

Linux container

Host Subsystem-Based apps

Android-based apps

Framework & runtime

Services and libraries (Service & Libs)

C runtime library (Glibc)

102

Compositor

Framework & runtime

Services and libraries (Service & Libs)

Compatibility layer

Graphics Memory Allocator

Hardware compatibility layer (HAL)

Input

(58) Field of Classification Search
CPC .... G09G 2340/12; G09G 5/005; G09G 5/397; G06T 15/005
See application file for complete search history.

(56) References Cited

U.S. PATENT DOCUMENTS

| | | | | |
|---|---|---|---|---|
| 8,065,687 | B2 | 11/2011 | Purtell, II | |
| 8,274,518 | B2 | 9/2012 | Blythe | |
| 8,724,696 | B2 | 5/2014 | Byford | |
| 9,798,562 | B2 | 10/2017 | Ren | |
| 2009/0088883 | A1 | 4/2009 | Baier | |
| 2009/0225093 | A1 | 9/2009 | Harper | |
| 2013/0145366 | A1* | 6/2013 | Newell | G06F 9/441 718/1 |
| 2016/0232872 | A1* | 8/2016 | Yoo | G06F 9/45558 |

* cited by examiner

GRAPHICS LAYER PROCESSING IN A MULTIPLE OPERATING SYSTEMS FRAMEWORK

CROSS REFERENCE TO OTHER APPLICATIONS

This application is a continuation-in-part of and claims priority to International (PCT) Application No. PCT/CN2018/092625, entitled GRAPHICS LAYER PROCESSING METHOD AND DEVICE filed on Jun. 25, 2018, which is incorporated herein by reference in its entirety for all purposes, which claims priority to China Patent Application No. 2017/10551288.5, entitled A GRAPHICS LAYER PROCESSING METHOD AND MEANS filed on Jul. 7, 2017 which is incorporated by reference in its entirety for all purposes.

FIELD OF THE INVENTION

The present application relates to a field of computer technology. In particular, the present application relates to techniques of processing graphics layers.

BACKGROUND OF THE INVENTION

A cloud operating system, which is also sometimes referred to as a "cloud OS," is an operating system supported by cloud computing and storage technology. Because a cloud operating system can integrate vast amounts of computing capacity and can provide powerful resource allocation capabilities, cloud operating systems are broadly applied.

A cloud operating system may be used on a traditional desktop system device (e.g., a PC), or it may be applied to a mobile device (e.g., a phone). Cloud operating system-based applications or services and traditional operating system-based applications or services may run within a cloud operating system framework, which means that cloud operating system frameworks will have to be able to merge together applications or services that are based on different operating systems.

Presently, merging applications or services that are based on different operating systems in the compositing layer within an operating system framework still remains a challenge.

SUMMARY

The present application discloses techniques comprising:

Present a first composition including a sub-graphics layer object associated with a graphical interface corresponding to an application at a display, wherein the application is executed in a guest subsystem;

Receive a content-related compositing request corresponding to a guest server graphics layer object in the guest subsystem, wherein the guest server graphics layer object corresponds to the sub-graphics layer object;

Use the guest server graphics layer object to obtain a host server graphics layer object that corresponds to the guest server graphics layer object, wherein the host server graphics layer object is in a host subsystem;

Obtain a buffer corresponding to the guest server graphics layer object; and

Generate a second composition including the sub-graphics layer object based at least in part on the content-related compositing request, graphical interface content data stored in the buffer corresponding to the guest server graphics layer object, window status data corresponding to the guest server graphics layer object, and window status data corresponding to the host server graphics layer object, wherein the second composition is to be presented at the display.

BRIEF DESCRIPTION OF THE DRAWINGS

Various embodiments of the invention are disclosed in the following detailed description and the accompanying drawings.

Embodiments of the present application are depicted in the attached drawings in an exemplary, non-restrictive manner.

DETAILED DESCRIPTION

Figure 1:
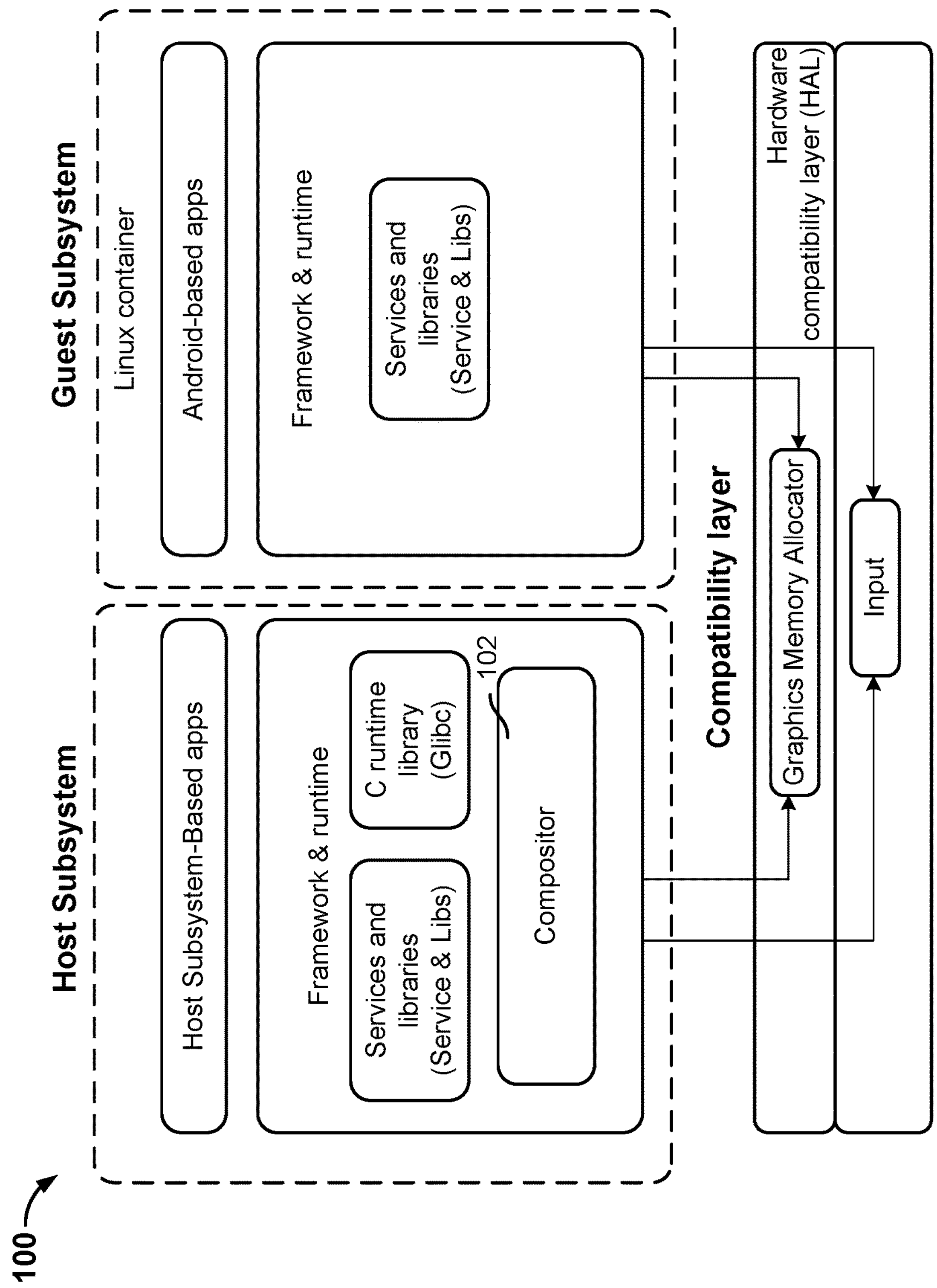
FIG. 1 presents as an embodiment of a diagram of an operating system framework encompassing multiple operating systems in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the concepts of the present application may easily undergo various modifications and substitutions, its specific embodiments have already been shown through the examples in the drawings and in the detailed descriptions in this document. However, please note that there is no intention of limiting the concepts of the present application to the disclosed specific forms. On the contrary, the intention is to cover all modifications, equivalents, and substitutions consistent with the present application and the attached claims.

In citing "one embodiment," "an embodiment," "an illustrative embodiment," etc., the specification is indicating that the described embodiment may include specific features, structures, or characteristics. However, each embodiment may or may not include particular features, structures, or characteristics. In addition, such phrases do not necessarily refer to the same embodiment. Furthermore, it is believed that, when specific features, structures, or characteristics are described in light of embodiments, such features, structures, or characteristics are affected through their combination with other embodiments (whether they are described clearly or not) within the scope of knowledge of persons skilled in the art. In addition, please understand that the items included in a list taking the form of "at least one of A, B and C" may be expressed as: (A), (B), (C), (A and B), (A and C), (B and C), or (A, B and C). Similarly, items listed in the form of "at least one of A, B or C" may be expressed as: (A), (B), (C), (A and B), (A and C), (B and C), or (A, B and C).

In some cases, the disclosed embodiment may be implemented as hardware, firmware, software, or any combination thereof. The disclosed embodiment may also be implemented as instructions that are carried or stored in one or more temporary or non-temporary machine-readable (e.g., computer-readable) storage media that can be read and executed by one or more processors. Machine-readable storage media may be embodied as any storage devices, mechanisms, or other devices with physical structures used to store or transmit information in machine-readable form (such as volatile or non-volatile memory, media disks, or other media).

In the drawings, some structures or method features may be shown in specific layouts and/or sequences. However, please understand that these specific layouts and/or sequences may be unnecessary. On the contrary, in some embodiments, these features may be laid out in ways and/or sequences that differ from what is shown in the illustrative drawings. In addition, the fact that a particular drawing includes structural or method features does not imply that such features are necessary in all embodiments. Moreover, in some embodiments, they may not be included, or they may be combined with other features.

Embodiments of graphics layer processing in a multiple operating systems framework are described herein. In various embodiments, an operating system framework includes a host subsystem and a guest subsystem, and where the host subsystem and guest subsystem share the compositor of the host subsystem. A first composition including a sub-graphics layer object associated with a graphical interface corresponding to an application is presented at a display. The application is executed in the guest subsystem. A content-related compositing request corresponding to a guest server graphics layer object in the guest subsystem is received. The guest server graphics layer object corresponds to the sub-graphics layer object. The guest server graphics layer object is used to obtain a host server graphics layer object that corresponds to the guest server graphics layer object. The host server graphics layer object is in the host subsystem. A buffer corresponding to the guest server graphics layer object is obtained. A second composition including the sub-graphics layer object is generated based at least in part on the content-related compositing request, graphical interface content data stored in the buffer corresponding to the guest server graphics layer object, and window status data corresponding to the host server graphics layer object. The second composition is to be presented at the display.

In order to better accommodate another type of operating system within a single operating system framework and to improve user experience, various embodiments described herein provide merged and unified processing operations for different operating systems on the compositing layer within a single operating system framework to result in a seamless dual-system experience.

FIG. 1 presents as an embodiment of a diagram of an operating system framework encompassing multiple operating systems in accordance with some embodiments. In the example of FIG. 1, operating system framework 100 includes two operating systems, each referred to as a "subsystem." The first subsystem is the host subsystem (e.g., a main subsystem) and the second subsystem is the guest subsystem (e.g., an auxiliary subsystem) and together, they form a dual-system-compatible architecture within operating system framework 100. For example, the host subsystem is a cloud operating system (e.g., YunOS™) and the guest subsystem is a traditional operating system (e.g., Android™). In some embodiments, the host subsystem runs on a first physical device and the guest subsystem runs on a second physical device. In some embodiments, the host subsystem and the guest subsystem both run on the same physical device.

In this example, the host and guest subsystems of operating system framework are separated by container technology. The hardware abstraction layer (HAL) in operating system framework 100 provides interfaces and driver services relating to graphics display and other aspects.

The glibc, i.e., the C runtime library, in the host subsystem is the application programming interface (API) of the Linux base layer. The compatibility layer (e.g., Libhybris) enables glibc-based operating systems to reuse existing Android driver services. The graphics memory allocator (e.g., Gralloc module) is located in the hardware abstraction layer (HAL). The graphics memory allocator module packages all access operations to the framebuffer. The compositor is the host subsystem's compositor and is shared by the host subsystem and the guest subsystem.

As will be described in detail further below, compositor 102, a component of the host subsystem that is shared by the host subsystem and the guest subsystem, is configured to merge graphical interfaces or layers that correspond to applications or services executed by the host or guest subsystem. In various embodiments, for an application that is executing in the guest subsystem, graphics layer objects are generated in both the host and guest subsystems that are usable to compositor 102 to generate updated compositions that include a graphical interface of the application at a display screen in response to events that trigger the updating of compositions.

Please note that YunOS™ and Android™ are merely example operating systems used to describe the above system architecture. Other types of operating systems may also achieve dual-system compatibility and effective merging within the compositing layer based on embodiments described herein.

To facilitate comprehension of embodiments described herein, technical terms associated with compositing are described below:

An “application,” a software program, may include one or more graphical interfaces, which are also sometimes referred to as “windows.” One graphical interface may correspond to at least one “graphics layer object,” which is also sometimes called a “surface.” Each graphical interface is displayed on a screen based on one or more of, but not limited to, the following parameters: a specified position, a specified size, and specified display content. A graphics layer object (surface) corresponding to a graphical interface is a container that corresponds to that graphical interface and that serves to store the control information/window status data (e.g., the size and position of the graphical interface on the screen) pertaining to that graphical interface and/or its content data (i.e., the content that the graphical interface needs to display). Examples of content data include the size and position of the graphical interface on the screen. Examples of control information/window status data include the content (e.g., text, graphics, dynamic elements, etc.) that is to be presented within the graphical interface. In various embodiments, a graphics layer object (surface) may be created by an application on a client in the compositor.

Multiple graphics layer objects (surfaces) may overlap when presented at the display screen of a device. In some embodiments, the surfaces to be presented at the display screen may pertain to the same application. In some embodiments, the surfaces to be presented at the display screen may pertain to at least two applications. The stacking of the graphics layer objects (surfaces) may be described according to the “Z-order.” The perpendicular direction of the screen plane has an axis that can be referred to as a “z-axis.” The front-to-back order/sequence of all graphics layer objects (surfaces) that are to be concurrently presented at the display screen is determined by their respective z-axis coordinates. That is, the graphic layer objects' (surfaces') respective z-axis coordinates describe which graphics layer objects (surfaces) stack on top or below other graphic layer objects and therefore, how the graphics layer objects cover or not cover each other. The z-axis order is sometimes referred to as the “Z-order.”

Figure 2:
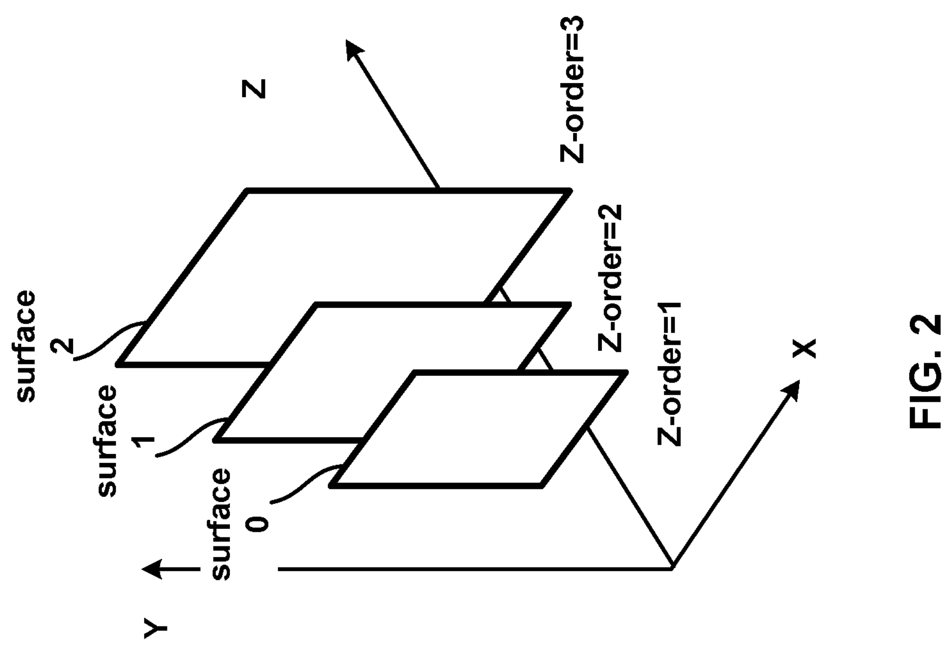
FIG. 2 is a diagram showing an example z-axis order of three graphics layer objects (surfaces) that are to be presented at a display screen.

FIG. 2 is a diagram showing an example z-axis order of three graphics layer objects (surfaces) that are to be presented at a display screen. The display screen is to present surface0, surface1, and surface2 in a top-to-bottom order as displayed on the screen. In the example of FIG. 2, surface0 partially covers surface1 (because surface0 has smaller dimensions than surface1), and surface1 partially covers surface2 (because surface1 has smaller dimensions than surface2). The Z-order positions of surface0, surface1, and surface2 are therefore, respectively, 1, 2, and 3.

Each graphics layer object (surface) corresponds to a layer object, which is sometimes referred to as a “layer,” on the z-axis. As mentioned above, a graphics layer object provides control information/window status operations and content data processing for its corresponding graphics layer object (surface).

In various embodiments, a “compositor,” which is shared by multiple subsystems (operating systems) within an operating system framework, is configured to manage the process of compositing (merging) different/multiple graphics layer objects, i.e., to control the merger of different graphics layer objects. For example, the compositor calculates the overlap area for each two graphics layer objects (surfaces) that are adjacent on the z-axis of a display screen so that the respective content that is to be presented by the graphics layer objects (surfaces) can be correctly displayed at the display screen. Correctly displaying different graphics layer objects includes hiding (not showing at the display screen) content of a graphics layer object that is overlapped by another graphics layer object's content and presenting at the display screen content of a graphics layer object that is not overlapped by another graphics layer object's content.

Where an operating system framework includes a host subsystem and a guest subsystem, there are main graphics layer objects (which are sometimes referred to as “main surfaces”) and sub-graphics layer objects (which are sometimes referred to as “subsurfaces”). In some embodiments, a “sub-graphics layer object” is a graphics layer object that is created in connection with a graphical interface of an application. In various embodiments, in the case of a sub-graphics layer object (subsurface) that corresponds to a graphical interface of an application, the graphical interface window status data (including control information) corresponding to the sub-graphics layer object is stored at the host subsystem, and the graphical interface content data corresponding to the sub-graphics layer object is stored at the guest subsystem.

The content that is displayed within the graphical interface of an application associated with a corresponding sub-graphics layer object (subsurface) may be updated when a content composition update event occurs. An example of when a content composition update event occurs is when a user interacts (e.g., selects a button) with the graphical interface of the application to cause different content to be presented at the graphical interface. When the content data of the graphical interface of the application associated with the sub-graphics layer object (subsurface) is updated, the compositor, which is shared by the host subsystem and the guest subsystem, is configured to update the composition/merger of layers corresponding to the updated sub-graphics layer object with one or more other graphics layer objects in the compositing layer based on one or both of the window status data and content data corresponding to that particular sub-graphics layer object.

The window status data used to describe the manner of presenting a graphical interface of an application associated with a corresponding sub-graphics layer object (subsurface) may be updated when a window status update event occurs. Examples of window status update events may include, but are not limited to: events generated on the basis of window shifts (e.g., in response to a user input), events generated on the basis of window contractions/expansions (e.g., in response to a user input), and events generated on the basis of window rotations (e.g., in response to a user input). As mentioned above, the window status data of a sub-graphics layer object (subsurface) may include control information including, but is not limited to: data used to describe the graphical interface's (window's) position (e.g., a respective z-axis coordinate) and/or direction (e.g., orientation).

In various embodiments, in connection with a sub-graphics layer object (subsurface) associated with an application, a host server graphics layer object is created in the host subsystem, and a guest server graphics layer object as well as a corresponding buffer are created in a guest subsystem. In various embodiments, the buffer is configured to store content data of the graphical interface (corresponding to the subsurface). In some embodiments, the host server graphics layer object is configured to obtain window status data of the graphical interface (corresponding to the subsurface) and where the window status data is stored in the host subsystem. In various embodiments, an association is established between the host server graphics layer object (in the host subsystem) and the guest server graphics layer object (in the guest subsystem). Therefore, both the host server graphics layer object and the guest server graphics layer object are associated with the same subsurface by virtue of this established association. As will be described in further detail below, when the graphical interface content data of the application changes (e.g., in response to a user input/interaction with the graphical interface), an application client in the guest subsystem (this client is sometimes referred to as the "guest client" or "guest app client") is configured to first locate the host server graphics layer object that corresponds to the graphical interface in the host subsystem using the established association between the host server graphics layer object and the guest server graphics layer object. Then, once the host client has located the host server graphics layer object, the host client is configured to use the host server graphics layer object to obtain window status data stored in the host subsystem. One or both of the obtained window status data and the graphical interface content data that is stored in the buffer corresponding to the guest server graphics layer object are used to update the composition of the sub-graphics layer object (subsurface) with zero or more other graphics layer objects at the display screen. Also, as will be described in further detail below, when the graphical interface window status of the application changes (e.g., in response to a user input/interaction with the positioning or dimensions of the graphical interface), an application client in the host subsystem (this client is sometimes referred to as the "host client" or "host app client") is configured to use the host server graphics object to obtain the graphical interface window status data that is stored in the host subsystem to update the composition of the sub-graphics layer object (subsurface) with zero or more other graphics layer objects at the display screen.

As such, the association between server graphics layer objects in different subsystems (the host subsystem and the client subsystem) makes the following possible: in response to an update event associated with a graphical interface of an application that is running on the guest subsystem, at least one of the window status data stored in the host subsystem and content data stored in the buffer corresponding to a corresponding guest server graphics layer object in the guest subsystem may be used together to generate an updated composition of layers at the display screen.

Examples of a graphics layer object (surface) creation process in accordance with some embodiments are described below in FIGS. 3 and 4. Example compositing processes in accordance with some embodiments are described below in FIGS. 5 and 6.

In some embodiments where the operating system framework includes two subsystems, a host subsystem and a guest subsystem, two clients are generated in connection with an application that is executing in the guest subsystem. One client is a client of the application in the host subsystem, which is sometimes referred to as the "host client." The other client is a client of the application in the guest subsystem, which is referred to as the "guest client." The two clients of the application may correspond to two different processes of the application in the operating system framework. In some embodiments, each client process has its own memory area. In some embodiments, the host client and guest client described above may be created when the guest subsystem-based application is started (e.g., opened, launched, or executed).

As will be described below with the example process of FIG. 3, in some embodiments, each of the host subsystem client and the guest subsystem client of a guest subsystem-based application may each create a respective server graphics layer object (surface) and establish an association between them.

Figure 3:
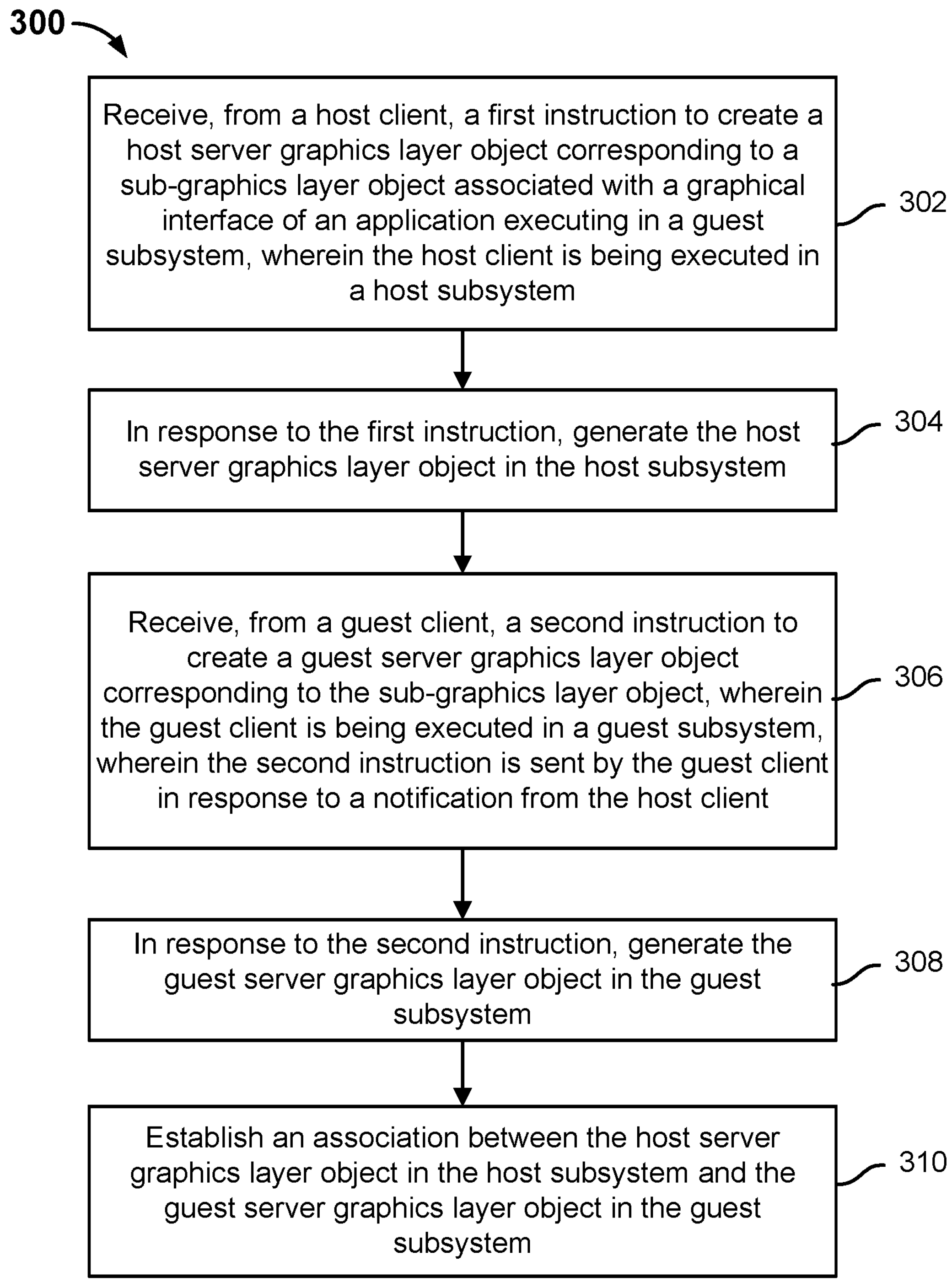
FIG. 3 is a flow diagram showing an example of a process for generating graphics layer objects corresponding to an application executing in a guest subsystem in an operating system framework that includes a host subsystem and the guest subsystem.

FIG. 3 is a flow diagram showing an example of a process for generating graphics layer objects corresponding to an application executing in a guest subsystem in an operating system framework that includes a host subsystem and the guest subsystem. In some embodiments, process 300 is implemented by compositor 102 of operating system framework 100 of FIG. 1.

For example, process 300 may be executed in response to the initial start (e.g., opening, launch, and execution) of the application in the guest subsystem. In another example, the process may be executed when a new graphical interface of the application is opened. Process 300 may also be executed in other scenarios. In process 300, it is assumed that a host client in the host subsystem and a guest client in the guest subsystem corresponding to the guest subsystem-based application have already been created. In some embodiments, the host client may generate a sub-graphics layer object (subsurface) corresponding to the (new) graphical interface of the application.

At 302, a first instruction to create a host server graphics layer object corresponding to a sub-graphics layer object associated with a graphical interface of an application executing in a guest subsystem is received from a host client, wherein the host client is being executed in a host subsystem.

At 304, in response to the first instruction, the host server graphics layer object is generated in the host subsystem.

In some embodiments, the host client may cause a host client graphics layer object for a sub-graphics layer object (subsurface) associated with a graphical interface of the guest subsystem-based application to be created by calling a library function module that is used to create graphics layer objects. After the first library function module is called, the host client instructs the compositor, which is part of the host subsystem but is shared by the host subsystem and the guest subsystem, to create a host server graphics layer object corresponding to the host client graphics layer object. For example, the library function module may be a function library in the host subsystem, which may contain multiple functions. These functions include functions for creating graphics layer objects. This function library may provide a function interface (e.g., an application programming interface (API)) to the application layer. The host client may use a function interface that is for creating graphics layer objects as a basis to call a corresponding function to create the host client graphics layer object.

In some embodiments, the host client instructs the compositor to create a host server graphics layer object that specifically corresponds to the sub-graphics layer object (subsurface) of the guest subsystem-based application. As a result, the generated host server graphics layer object corresponds to the subsurface or is associated with the subsurface. In a specific example, the host server graphics layer object may be associated with the sub-graphics layer object (subsurface) by being generated to include the name (e.g., any combination of alpha numerical strings or other identifiers) of the sub-graphics layer object (subsurface).

At 306, a second instruction to create a guest server graphics layer object corresponding to the sub-graphics layer object is received from a guest client, wherein the guest client is being executed in a guest subsystem, wherein the second instruction is sent by the guest client in response to a notification from the host client.

The host client sends a notification to a guest client to instruct that a guest server graphics layer object be created for the sub-graphics layer object (subsurface). For example, the host client may use an inter-process communication (IPC) protocol to send a notification message to the guest client. Furthermore, the notification message may include the name of the sub-graphics layer object (subsurface).

In some embodiments, the host client may use one or both of the following example approaches to obtain the name of the sub-graphics layer object (subsurface):

Approach 1: The host client receives the name of the sub-graphics layer object (subsurface) corresponding to the host server graphics layer object back from the compositor after it creates the host server graphics layer object.

Approach 2: The host client may pre-register a callback function. After the compositor creates the host server graphics layer object, this callback function may notify the host client of the name of the subsurface corresponding to the recently created host server graphics layer object.

At 308, in response to the second instruction, the guest server graphics layer object is generated in the guest subsystem.

At 310, an association is established between the host server graphics layer object in the host subsystem and the guest server graphics layer object in the guest subsystem.

In some embodiments, the guest client may obtain the name of the sub-graphics layer object (subsurface) corresponding to the host server graphics layer object in the notification from the host client. The guest client may then instruct the compositor to create a guest server graphics layer object for the sub-graphics layer object (subsurface) corresponding to the host server graphics layer object and cause the created guest server graphics layer object to correspond to or be associated with the sub-graphics layer object (subsurface).

In some embodiments, the guest client is configured to cause a guest client graphics layer object for the graphical interface of the guest subsystem-based application to be created by calling a library function module (a module that is different from the one that was called by the host client) to create a guest client graphics layer object. After the library function module is called, the guest client is configured to instruct the compositor to create a guest server graphics layer object corresponding to the guest client graphics layer object. The library function module that is called by the guest client may be a function library in the guest subsystem, which may include multiple functions. These functions include functions for creating graphics layer objects. This function library may provide a function interface (e.g., an application programming interface (API)) to the application layer. The guest client may use a function interface that is for creating graphics layer objects as a basis to call a corresponding function to create a graphics layer object.

In step 310, various approaches may be used to establish an association between the host server graphics layer object and the guest server graphics layer object. In a first example approach, the name of a graphics layer object corresponding to the guest server graphics layer object (i.e., the name of the sub-graphics layer object (subsurface)) may be set to be the same as the name of a graphics layer object corresponding to the host server graphics layer object (i.e., the name of the sub-graphics layer object (subsurface)). In this way, the host server graphics layer object and the guest server graphics layer object correspond to a sub-graphics layer object (subsurface) of the same name. That is, the host server graphics layer object and the guest server graphics layer object are associated with the same subsurface. In a second example, a corresponding relationship (e.g., an ID pair) is stored between a respective ID of the host server graphics layer object and a respective ID of the guest server graphics layer object.

Furthermore, the guest client is configured to also create a buffer for the sub-graphics layer object (subsurface). The buffer corresponds to the sub-graphics layer object (subsurface) of the graphical interface of the guest subsystem-based application. Given that the subsurface corresponds to the guest server graphics layer object and the guest client graphics layer object, and given that the buffer corresponds to the subsurface, the buffer also corresponds to the guest server graphics layer object and the guest client graphics layer object. In various embodiments, the buffer that corresponds to the subsurface (sub-graphics layer object) of the graphical interface of the guest subsystem-based application stores the content data of the graphical interface. For example, the content data may refer to data that may be rendered and presented within the graphical interface. The buffer is configured to store content data that is to be presented at the graphical interface in response to a content data update event with respect to the graphical interface. The content composition update events may include graphical interface rendering events. For example, a content composition update event may be generated after content is initially rendered for the graphical interface. For example, a content composition update event is generated in response to a user input with respect to the graphical interface at the display screen. Compositing a graphical interface of an application is discussed in greater detail below in connection with FIGS. 5 and 6.

There is no strict requirement concerning the sequence of steps in process 300 as described above. For example, the order in which steps 306 and 308 may be executed before steps 302 and 304 or vice versa can be varied.

Figure 4:
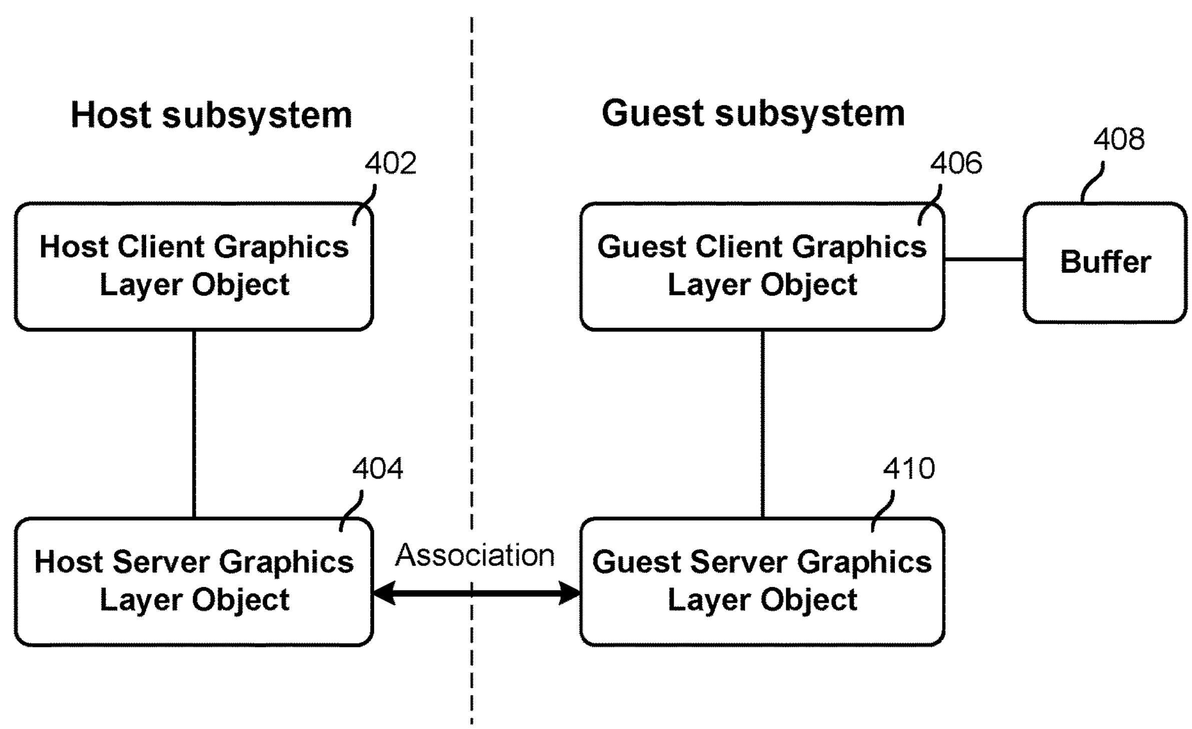
FIG. 4 is a diagram showing example graphics layer objects that are created in connection with a graphical interface of an application executing in a guest subsystem in accordance with some embodiments.

FIG. 4 is a diagram showing example graphics layer objects that are created in connection with a graphical interface of an application executing in a guest subsystem in accordance with some embodiments. The graphical interface corresponds to a sub-graphics layer object (subsurface). As shown in the diagram, host client graphics layer object 402 and host server graphics layer object 404 are graphics layer objects created by the host client (not shown) in the host subsystem, and guest client graphics layer object 406 and guest server graphics layer object 410 are graphics layer objects created by the guest client (not shown) in the guest subsystem. In the host subsystem, host client graphics layer object 402 is created first, and host client graphics layer object 402, as a parent, creates a child: host server graphics layer object 404. In the guest subsystem, guest client graphics layer object 406 is created first, and guest client graphics layer object 406, as a parent, creates a child: guest server graphics layer object 410. Host server graphics layer object 404 and guest server graphics layer object 410 are associated with each other, and both are associated with the sub-graphics layer object (subsurface) of the graphical interface of the guest subsystem-based application. Guest client graphics layer object 406 (and also, guest server graphics layer object 410) corresponds to buffer 408 that is used to store the content data for the sub-graphics layer object (subsurface).

An application that is executing in a guest subsystem, as described above, may update its graphical interface in response to a user operation. The application may also update its graphical interface according to a set refresh cycle. Updating the graphical interface of an application may include two aspects:

(1) The content that is presented in the graphical interface is updated in a graphics rendering process. After the graphic rendering process is completed (i.e., after obtaining the graphical interface content data), the compositor implements the composition including by determining how to place and stack the graphical interface among other graphical interfaces, if any, that are to be presented at the display screen.

(2) The manner (e.g., the size and position) with which the graphical interface is presented is updated in a window status updating process. After the graphical interface window status updating process is updated, the compositor implements the composition including by determining how to place and stack the graphical interface among other graphical interfaces, if any, that are to be presented at the display screen.

Depending on the nature of the composition update event that triggers an update to the graphical interface of the application, either one or both of aspects of updating the graphical interface of an application described above may be performed. In the event that both aspects of updating the graphical interface are performed, they may be performed at least partially concurrently with each other.

Figure 5:
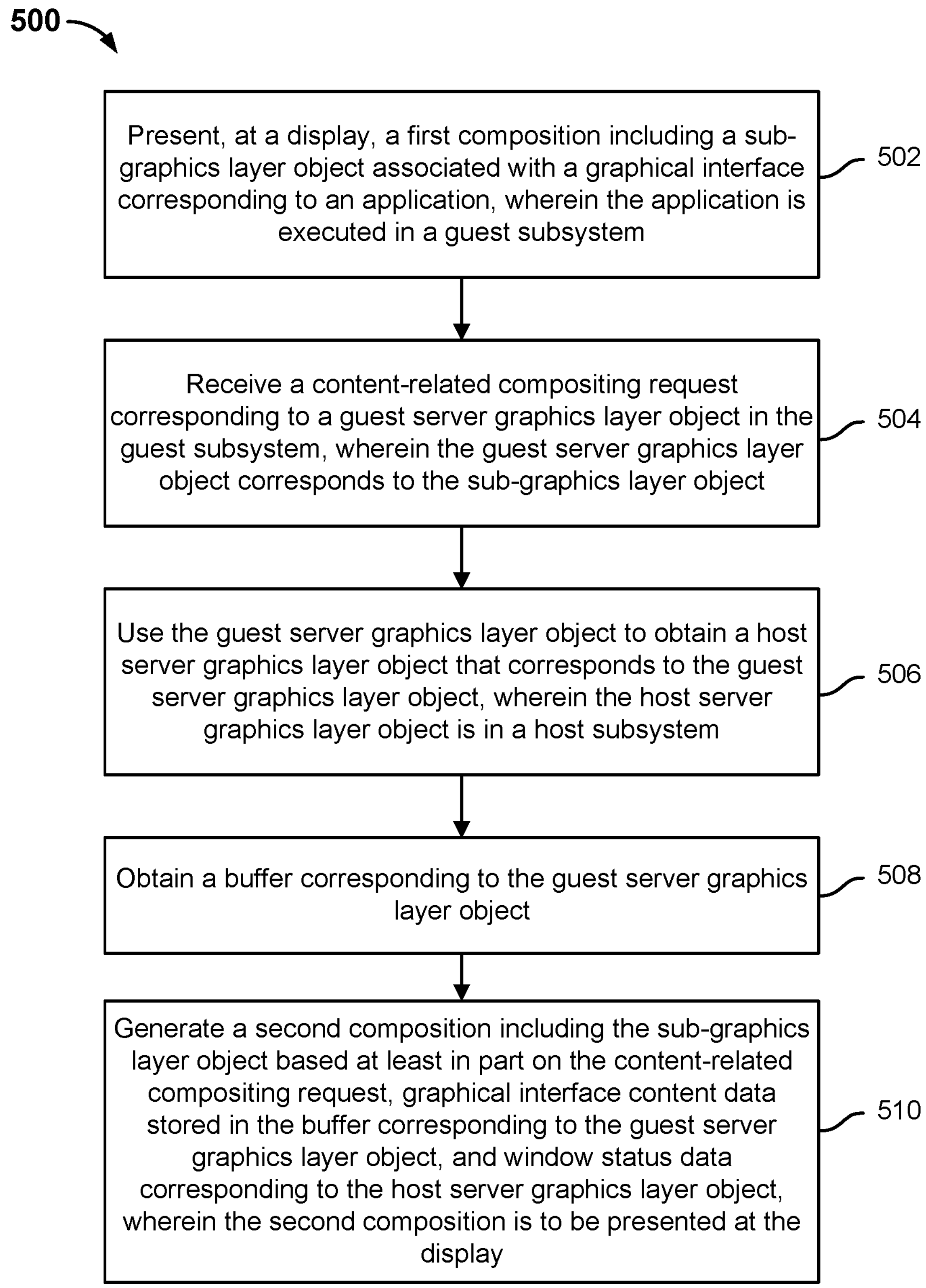
FIG. 5 is a flow diagram showing an embodiment of a process of performing compositing for a display in response to a content-related compositing request.

FIG. 5 is a flow diagram showing an embodiment of a process of performing compositing for a display in response to a content-related compositing request. In some embodiments, process 500 is implemented by compositor 102 of operating system framework 100 of FIG. 1.

After an application has started executing in the guest subsystem of an operating system framework that includes a host subsystem and the guest subsystem, a process such as process 300 of FIG. 3 is executed to generate a host client graphics layer object, a host server graphics layer object, a guest client graphics layer object, and a guest server graphics layer object in connection with a graphical interface corresponding to the application. Process 500 is implemented after such graphics layer objects have been created in connection with the graphical interface corresponding to the application. In some embodiments, the graphical interface corresponding to the application executing in the guest subsystem is associated with a corresponding sub-graphics layer object (subsurface).

At 502, a first composition including a sub-graphics layer object associated with a graphical interface corresponding to an application is presented at a display, wherein the application is executed in a guest subsystem.

The initial content and window status (e.g., size and position, as well as other attributes) of a graphical interface corresponding to a guest subsystem-based application have already been rendered and composited in an initial display that is presented at the display screen of a device. In some embodiments, the initial content and window status of the graphical interface were rendered by the guest client using the guest client graphics layer object and the content data corresponding to the sub-graphics layer object (subsurface) that is stored in the buffer corresponding to the guest client graphics layer object.

At 504, a content-related compositing request corresponding to a guest server graphics layer object in the guest subsystem is received, wherein the guest server graphics layer object corresponds to the sub-graphics layer object.

In various embodiments, a user operation with respect to the graphical interface of the application at the display (e.g., a touchscreen or other input device) that causes a content update or a (e.g., periodically) scheduled update (e.g., refresh) event is a content composition update event that prompts a content-related compositing request to be generated. For example, a user operation that causes a content update to be generated is a user selection of an interactive element (e.g., button) in the graphical interface. The content-related compositing request will trigger the graphical interface of the application to be updated and also re-composited along with zero or more other graphical interfaces at the display screen to form a new, updated composition to be presented at the display screen.

In some embodiments, a content-related compositing request is generated by a guest client in response to a detected content composition update event. In some embodiments, a content-related compositing request is processed according to an asynchronous event mechanism or according to a synchronous event mechanism. When an asynchronous event mechanism is used, the guest client generates a content-related compositing request and stores this request in an event queue. The compositor then acquires a content-related compositing request (e.g., that is at the head of the event queue) from the event queue according to the asynchronous event mechanism and processes that request. When a synchronous event mechanism is used, the guest client sends a content-related compositing request to the compositor sometime after rendering an initial graphical interface based on (e.g., the content data stored in a buffer corresponding to) a guest server graphics layer object. The compositor is configured to implement a composition in response to the request that it received from the guest client. For example, the guest client may call a guest client graphics layer object and then the guest client graphics layer object may call the guest server graphics layer object to implement graphics rendering.

At 506, the guest server graphics layer object is used to obtain a host server graphics layer object that corresponds to the guest server graphics layer object, wherein the host server graphics layer object is in a host subsystem.

In some embodiments, the name of the subsurface corresponding to the host server graphics layer object has the same name as the subsurface corresponding to the guest server graphics layer object. As such, the name of the subsurface corresponding to the guest server graphics layer object may be extracted and used to locate the host server graphics layer object that corresponds to the same subsurface name.

At 508, a buffer corresponding to the guest server graphics layer object is obtained.

At 510, a second composition including the sub-graphics layer object is generated based at least in part on the content-related compositing request, graphical interface content data stored in the buffer corresponding to the guest server graphics layer object, and window status data corresponding to the host server graphics layer object, wherein the second composition is to be presented at the display.

A buffer corresponding to the guest server graphics layer object is obtained. The buffer stores graphical interface content data of the subsurface corresponding to the guest server graphics layer object. As described above, in various embodiments, the buffer corresponding to the guest server graphics layer object stores content data that is to be rendered and displayed within the graphical interface of the application corresponding to the sub-graphics layer object. In various embodiments, the host server graphics layer object is configured to obtain window status data stored in the host subsystem. The window status data includes control information (e.g., the size, position, and other control attributes) with respect to the graphical interface of the application corresponding to the sub-graphics layer object. The content-related compositing request may include instructions or parameters that describe the type of update (e.g., which new content should be presented at the graphical interface, what size the graphical interface should be, where on the display screen the graphical interface should be presented, etc.) that is to be performed for the graphical interface of the application. As such, the content-related composition request may be processed by using its included instructions/parameters, the content data that is included in the buffer corresponding to the guest server graphics layer object, and the window status data that corresponds to the host server graphics layer object (and the sub-graphics layer object) to render an updated graphical interface of the application (e.g., update the corresponding subsurface). Then, the rendered, updated subsurface can be composited with zero or more other graphical interfaces using the Z-order of all the graphics layer objects to generate a new, updated composition of layers that is to be presented at the display screen. The new, updated composition of layers will replace the previous composition.

Figure 6:
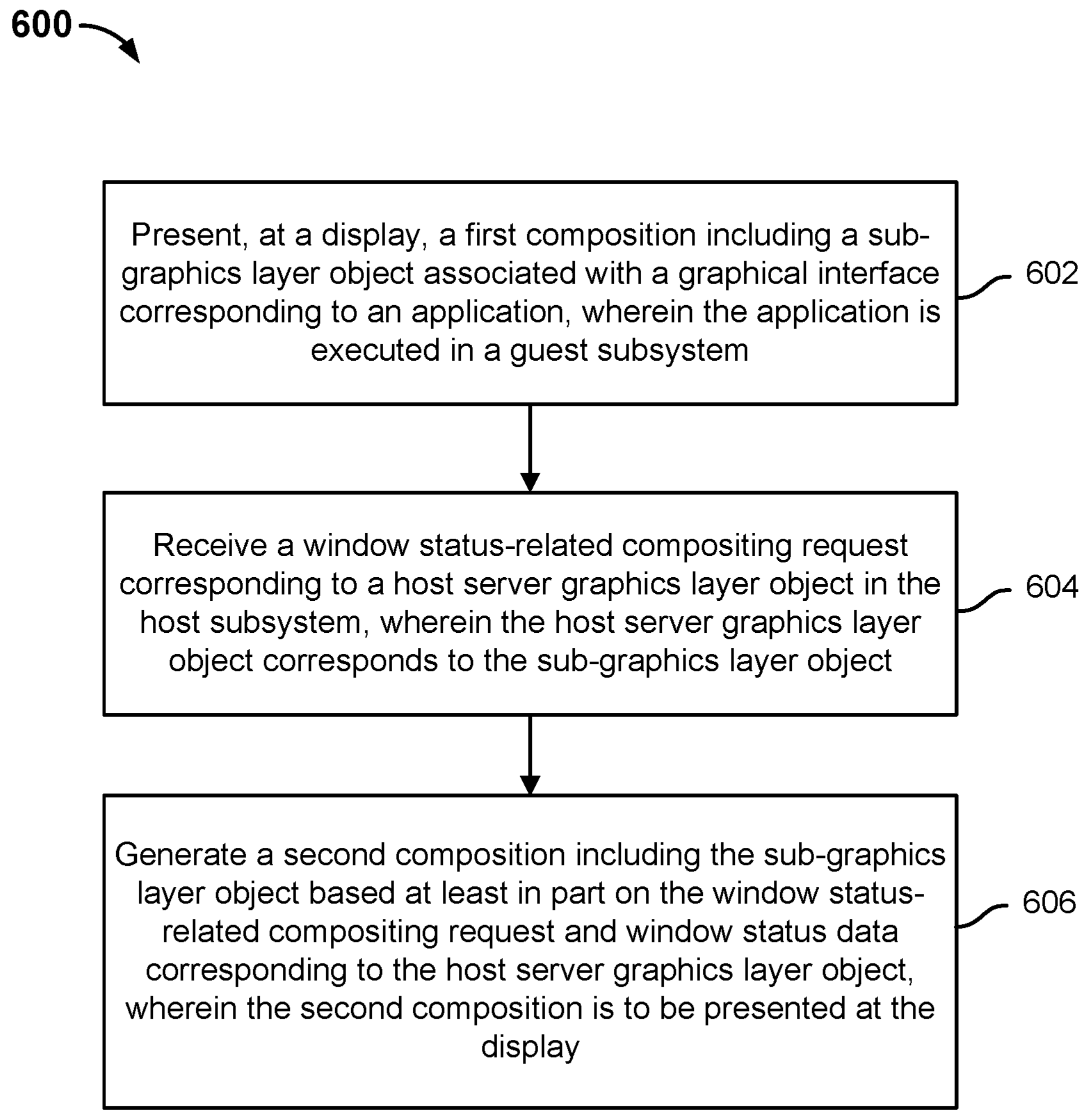
FIG. 6 is a flow diagram showing an embodiment of a process of performing compositing for a display in response to a window status-related compositing request.

FIG. 6 is a flow diagram showing an embodiment of a process of performing compositing for a display in response to a window status-related compositing request. In some embodiments, process 600 is implemented by compositor 102 of operating system framework 100 of FIG. 1.

After an application has started executing in the guest subsystem of an operating system framework that includes a host subsystem and the guest subsystem, a process such as process 300 of FIG. 3 is executed to generate a host client graphics layer object, a host server graphics layer object, a guest client graphics layer object, and a guest server graphics layer object in connection with a graphical interface corresponding to the application. Process 600 is implemented after such graphics layer objects have been created in connection with the graphical interface corresponding to the application. In some embodiments, the graphical interface corresponding to the application executing in the guest subsystem is associated with a corresponding sub-graphics layer object (subsurface).

At 602, a first composition including a sub-graphics layer object associated with a graphical interface corresponding to an application is presented at a display, wherein the application is executed by a guest subsystem.

The initial content and window status (e.g., size and position, as well as other attributes) of a graphical interface corresponding to a guest subsystem-based application have already been rendered and composited in an initial display that is presented at the display screen of a device. In some embodiments, the initial content and window status of the graphical interface were rendered by the guest client using the guest client graphics layer object and the content data corresponding to the sub-graphics layer object (subsurface) that is stored in the buffer corresponding to the guest client graphics layer object.

At 604, a window status-related compositing request corresponding to a host server graphics layer object being in a host subsystem is received, wherein the host server graphics layer object corresponds to the sub-graphics layer object.

In various embodiments, a user operation with respect to the graphical interface of the application at the display (e.g., a touchscreen or other input device) that causes a window status update is a window status update event that prompts a window status-related compositing request to be generated. For example, a user operation that causes a window status update to be generated is a user operation to change the size/dimensions of the graphical interface, drag the graphical interface to a different part of the display, and/or rotate the graphical interface. The window status-related compositing request will trigger the graphical interface of the application to be updated and also re-composited along with zero or more other graphical interfaces at the display screen to form a new, updated composition to be presented at the display screen.

In some embodiments, a window status-related compositing request is generated by a host client in response to a detected window status composition update event. In some embodiments, a window related-related compositing request is processed according to an asynchronous event mechanism or according to a synchronous event mechanism. When an asynchronous event mechanism is used, the host client updates the window status corresponding to the sub-graphics layer object and generates a window status-related compositing request and stores this request in an event queue. The compositor then acquires a window status-related compositing request (e.g., that is at the head of the event queue) from the event queue according to the asynchronous event mechanism and processes that request. When a synchronous event mechanism is used, the host client sends a window status-related compositing request to the compositor sometime after updating the window status data, which is stored in the host sub-system, that corresponds to the host server graphics layer object. The compositor is configured to implement a composition in response to the request that it received from the host client. For example, the host client may call a host client graphics layer object and then the host client graphics layer object may call the host server graphics layer object to implement graphics rendering.

At 606, a second composition including the sub-graphics layer object corresponding to the application is generated based at least in part on the window status-related compositing request and window status data corresponding to the host server graphics layer object, wherein the second composition is to be presented at the display.

As described above, in various embodiments, the host server graphics layer object is usable to obtain, at the host subsystem, window status data that includes control information (e.g., the size, position, and other control attributes) with respect to the graphical interface of the application corresponding to the sub-graphics layer object. The window status-related compositing request may include instructions or parameters that describe the type of update (e.g., what size the graphical interface should be, where on the display screen the graphical interface should be presented, etc.) that is to be performed for the graphical interface of the application. As such, the window status-related composition request may be processed by using its included instructions/parameters and the window status data that is obtained by the host server graphics layer object (and the sub-graphics layer object) to render an updated graphical interface of the application (e.g., update the corresponding subsurface). Then, the rendered, updated subsurface can be composited with zero or more other graphical interfaces using the Z-order of all the graphics layer objects to generate a new, updated composition of layers that is to be presented at the display screen. The new, updated composition of layers will replace the previous composition.

The following describes a specific example scenario of performing compositing in connection with a graphical interface of an application that is executing in a guest subsystem of a dual-subsystem operating system framework:

In this example, the operating system framework is used by a smart phone and includes a host subsystem (which corresponds to a cloud operating system such as YunOS™) and a guest subsystem (which corresponds to a conventional operating system such as Android™). These two subsystems share the use of a compositor (which is implemented on a compositor server). The smart phone has Application A installed on it. Application A is an Android system-based widget application.

When a user clicks on the icon for Application A on the homepage of the Android operating system, that operation is captured by the operating system and the operating system generates a start event for Application A. The start event for Application A is sent to both the host subsystem and the guest subsystem. The host subsystem creates a client within the host subsystem for Application A based on the Application A start event. For the sake of descriptive convenience, this client will be called "Host_client_appA." Host_client_appA creates a subsurface (associated with a graphical interface) for Application A. The name of this subsurface is "N." The guest subsystem creates a client within the guest subsystem for Application A based on the Application A start event. For the sake of descriptive convenience, this client will be called Guest_client_appA. Host_client_appA and Guest_client_appA may communicate with each other using a protocol such as IPC, for example.

Figure 7:
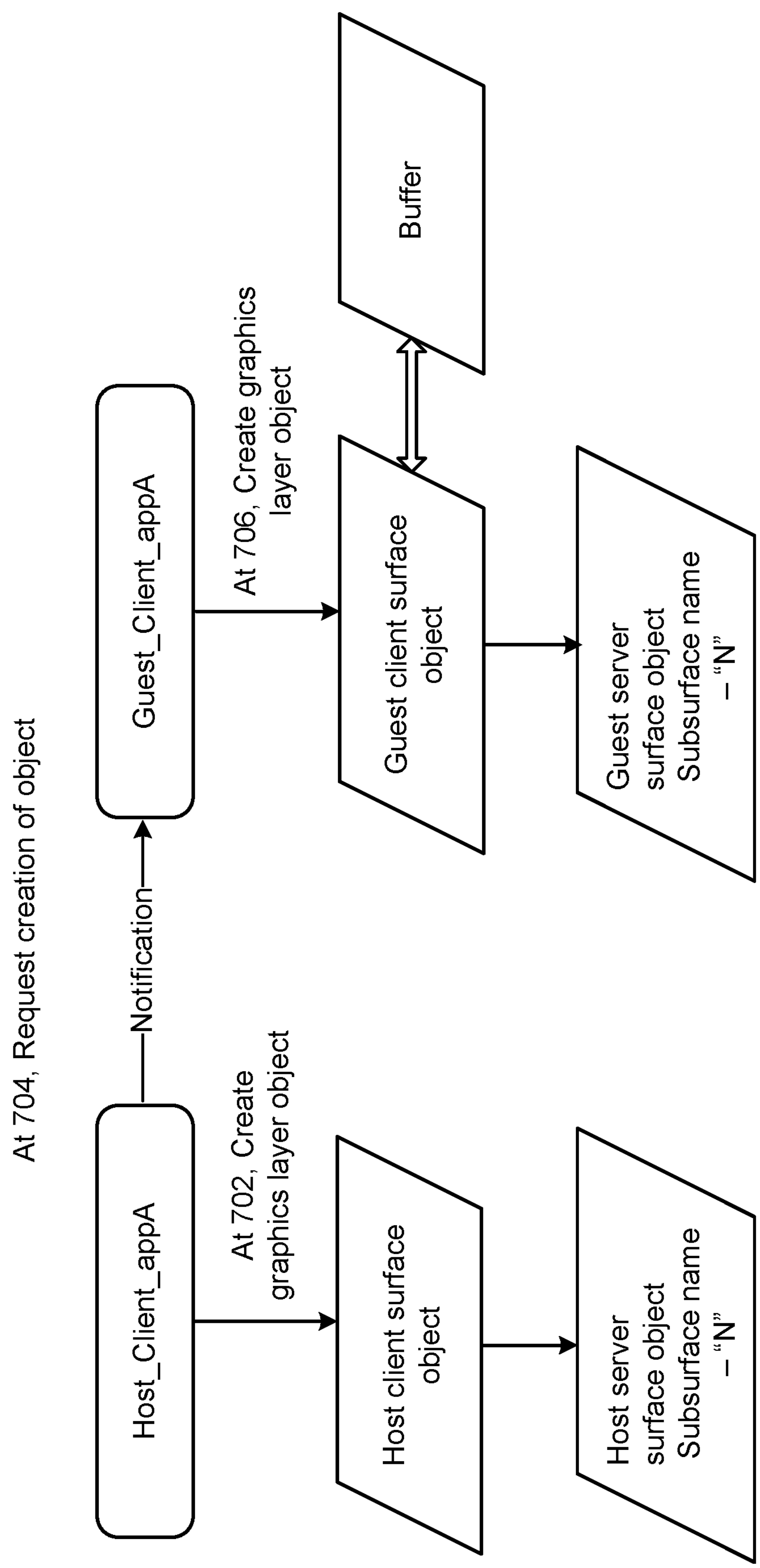
FIG. 7 is a diagram showing an example of a process where Host_client_appA and Guest_client_appA create compositing-related objects.

After Host_client_appA and Guest_client_appA are created, a compositing-related object may be created. FIG. 7 is a diagram showing an example of a process where Host_client_appA and Guest_client_appA create compositing-related objects.

At 702 of FIG. 7, Host_client_appA calls the graphical user interface library module (e.g., libgui module) to create a client surface object in the host subsystem for Application A. This surface object is called the "host client surface" (which is abbreviated as "HC_surface") object. The HC_surface object corresponds to Application A subsurface N and is created in connection with Application A subsurface N. The libgui module packages the relevant native layer functions directed at the surface object. These may be used to create the surface object. When the libgui module is called, it instructs the compositor (compositor server) to create a server surface object in the host subsystem for Application A. This surface object will be referred to here as the "host server surface" (which is abbreviated as "HS_surface") object. The HS_surface object corresponds to Application A subsurface N and is created in connection with Application A subsurface N. After the HS_surface object is created, the callback function registered by Host_client_appA notifies Host_client_appA of the name "N" of the subsurface corresponding to HS_surface.

At 704 of FIG. 7, Host_client_appA sends to Guest_client_appA a request that includes the name "N" of the subsurface corresponding to HS_surface in order to request creation of a corresponding surface object in the guest subsystem for Application A.

At 706 of FIG. 7, after Guest_client_appA receives a request sent by Host_client_appA, it calls the function library module in the guest subsystem to create a layer object for Application A and to create a surface object of the client in the guest subsystem for Application A according to the name "N" of the subsurface object corresponding to the HS_surface object in the request message. This surface object will be referred to as the "guest client surface" (which is abbreviated as "GC_surface") object. The GC_surface object corresponds to Application A subsurface N and is created in connection with Application A subsurface N. When the function bank module is called, it instructs the compositor (compositor server) to create a server surface object in the guest subsystem for Application A based on the subsurface name corresponding to the GC_surface object. This surface object will be referred to as the "guest server surface" (which is abbreviated as "GS_surface") object. The name of the subsurface corresponding to this GS_surface object is "N."

Guest_client_appA also creates a buffer corresponding to subsurface N. The buffer is used to store graphical interface content data of Application A. Since the GC_surface object and the GS_surface object are created on the basis of the subsurface, the buffer also corresponds to the GC_surface object and the GS_surface object.

While Application A is running, Guest_client_appA renders an initial graphical interface corresponding to Guest_client_appA and stores the rendered graphical interface content data in a buffer corresponding to the Application A GC_surface object in the guest subsystem.

When the graphical interface content data in the buffer has been rendered or another graphical interface compositing condition has been met, Guest_client_appA uses the GC_surface object to acquire the GS_surface object and, using a protocol such as an IPC, the Guest_client_appA sends a content-related compositing request to the compositor on the basis of the GS_surface object. The compositor acquires the associated HS_surface object according to the GS_surface object's stored association with the HS_surface object. On the basis of the HS_surface object, it uses the graphical interface content data in the buffer corresponding to the GS_surface object, the graphical interface window status data of the corresponding subsurface saved in the host subsystem, and Z-order and other information to implement the updated composition.

If the window status (e.g., position, size, or orientation) of the graphical interface changes while Application A is running, Host_client_app A instructs the compositor through the IPC communication mechanism to implement composition directed at the window status-updated graphical interface. The compositor, on the basis of the HS_surface object and the corresponding subsurface, acquires the corresponding graphical interface window status data that is stored at the host subsystem and, combining it with Z-order and other information, implements the updated composition.

As described above, a compositor acquires a content-related compositing request. Because the content-related compositing request corresponds to a guest server graphics layer object in a guest subsystem, the compositor may use the guest server graphics layer object corresponding to the content-related compositing request as a basis to acquire a host server graphics layer object, which is in a host subsystem and is associated with the guest server graphics layer object. The compositor acquires a buffer corresponding to the guest server graphics layer object and responds to the content-related compositing request according to graphical interface content data that is stored in the buffer and that corresponds to the sub-graphics layer object. Because the host server graphics layer object and the guest server graphics layer object were created in connection with the sub-graphics layer object of an application, the compositor responds to the content-related compositing request in the manner described above and thus uses the graphical interface content data corresponding to the sub-graphics layer object of the application to implement a composition. As such, a merger of applications or services that are based on different operating systems are accomplished in the compositing layer within one operating system framework.

Figure 8:
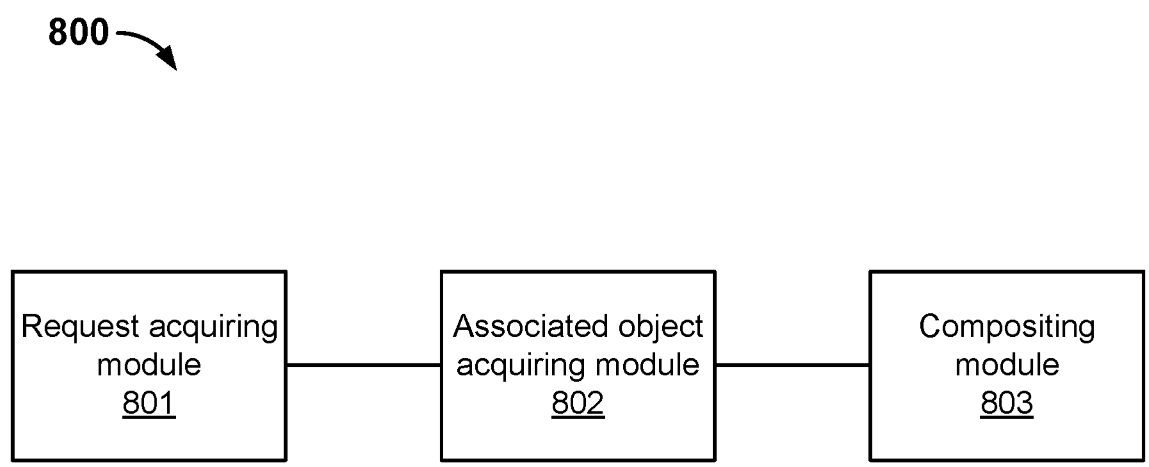
FIG. 8 is a diagram showing an example structural diagram of a compositor in accordance with some embodiments.

FIG. 8 is a diagram showing an example structural diagram of a compositor in accordance with some embodiments. Compositor 800 is shared by a host subsystem and a guest subsystem in an operating system framework. Compositor 800 comprises request acquiring module 801, associated object acquiring module 802, and compositing module 803.

The modules described above can be implemented as software components executing on one or more processors, as hardware such as programmable logic devices, and/or as Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules, sub-modules, and units may be implemented on a single device or distributed across multiple devices.

Request acquiring module 801 is configured to acquire a content-related compositing request. The content-related compositing request corresponds to a guest server graphics layer object in a guest subsystem.

Associated object acquiring module 802 is configured to use the guest server graphics layer object to obtain a host server graphics layer object that corresponds to the guest server graphics layer object. The host server graphics layer object is in a host subsystem and both the host server graphics layer object and the guest server graphics layer object were created in connection with a sub-graphics layer object of an application executing in the guest subsystem.

Compositing module 803 is configured to obtain a buffer corresponding to the guest server graphics layer object. Compositing module 803 is configured to generate a new composition including the sub-graphics layer object based at least in part on the content-related compositing request, graphical interface content data stored in the buffer corresponding to the guest server graphics layer object, and window status data corresponding to the host server graphics layer object. The second composition is to be presented at the display.

In some embodiments, associated object acquiring module 802 is configured to use the name of the sub-graphics layer object corresponding to the guest server graphics layer object as a basis to obtain a host server graphics layer object corresponding to the same sub-graphics layer object name.

In some embodiments, the content-related compositing request is generated by a guest client after rendering a graphical interface of the guest subsystem-based application on the basis of a guest client graphics layer object. The guest client graphics layer object corresponds to the guest server graphics layer object. The guest client is a client of the guest subsystem-based application within the guest subsystem.

In some embodiments, request acquiring module 801 is further configured to obtain a window status-related compositing request corresponding to a host server graphics layer object being in a host subsystem. The host server graphics layer object corresponds to the sub-graphics layer object. Request acquiring module 801 is further configured to use a window status-related compositing request and window status data stored corresponding to the host server graphics layer object to generate a second composition including the sub-graphics layer object corresponding to the application. The second composition is to be presented at the display.

In some embodiments, the window status-related compositing request is generated on the basis of a host client graphics layer object by a host client update operation directed at the graphical interface window status of the guest subsystem-based application. The host client graphics layer object corresponds to the host server graphics layer object and the host client is a client of the first app within the host subsystem.

Various embodiments described herein may be implemented as computer instructions stored on one or more computer-readable media. Upon being executed by one or more processors, the computer instructions are configured to cause a communication device to execute the processes described herein.

Various embodiments described herein may be implemented as a system that includes one or more processors and one or more memories, where the one or more memories are coupled to the one or more processors and configured to provide instructions to the one or more processors.

Figure 9:
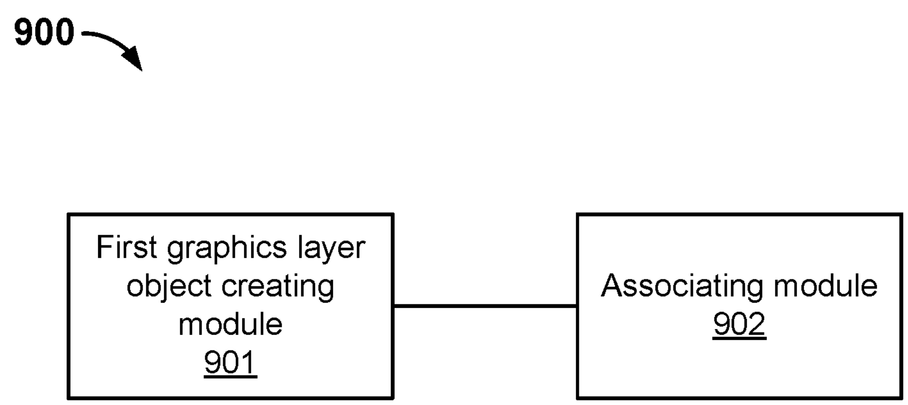
FIG. 9 is a structural diagram that shows an example compositor in accordance with some embodiments.

FIG. 9 is a structural diagram that shows an example compositor in accordance with some embodiments. Compositor 900 is shared by a host subsystem and a guest subsystem in an operating system framework. Compositor 900 comprises first graphics layer object creating module 901 and associating module 902.

First graphics layer object creating module 901 is configured to create a host server graphics layer object in connection with a sub-graphics layer object of an application executing in a guest subsystem according to a host client instruction. First graphics layer object creating module 901 is configured to create a guest server graphics layer object in connection with a sub-graphics layer object of the application according to a guest client instruction. The instruction was sent by the guest client to the compositor according to the notification sent by the host client. The host client is a client of the application within a host subsystem, and the guest client is a client of the application within a guest subsystem.

Associating module 902 is configured to establish an association between the guest server graphics layer object and the host server graphics layer object.

In some embodiments, associating module 902 is configured to set the name of a sub-graphics layer object corresponding to the guest server graphics layer object to be the same as the name of the sub-graphics layer object corresponding to the host server graphics layer object.

In some embodiments, associating module 902 is configured to obtain the name of the sub-graphics layer object corresponding to the host server graphics layer object from the guest client. The name of the sub-graphics layer object is included in a notification sent by the host client to the guest client.

Figure 10:
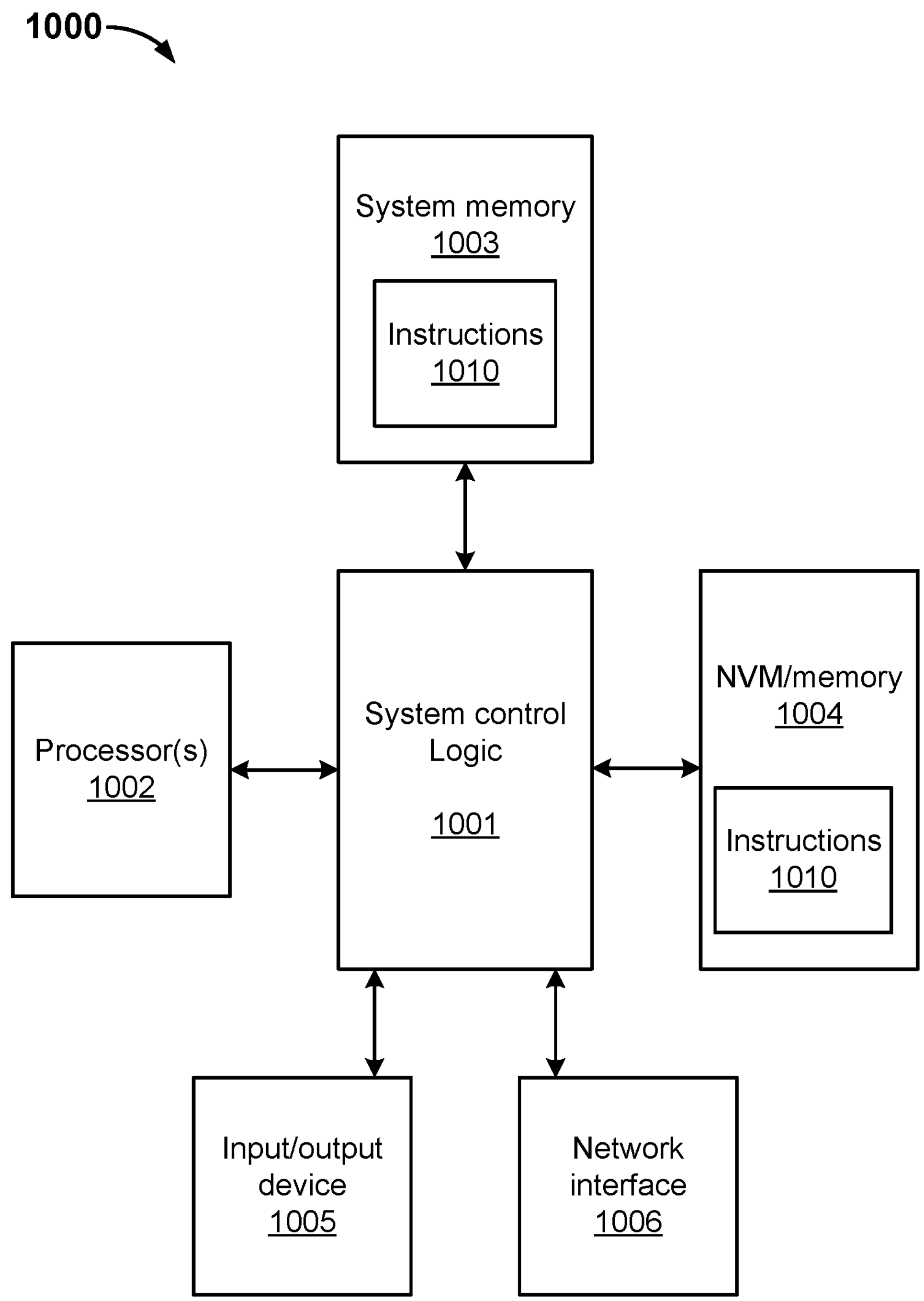
FIG. 10 presents as an example of a device on which at least a portion of an operating system framework can run in accordance with some embodiments.

FIG. 10 presents as an example of a device on which at least a portion of an operating system framework can run in accordance with some embodiments. Device 1000 may comprise one or more processors 1002, system control logic 1001 coupled to at least one processor 1002, non-volatile memory NVM/memory 1004 coupled to system control logic 1001, and network interface 1006 coupled to system control logic 1001.

Processor(s) 1002 may comprise one or more single-core processors or multi-core processors. Processor(s) 1002 may comprise any combination of general-purpose processors or special-purpose processors (such as image processors, app processors, and baseband processors).

System control logic 1001 in an embodiment may comprise any appropriate interface controller to provide any suitable interface to at least one of processor(s) 1002 and/or to provide any suitable interface to any suitable device or component communicating with system control logic 1001.

System control logic 1001 in an embodiment may comprise one or more memory controllers so as to provide interfaces to system memory 1003. System memory 1003 is configured to load and store data and/or instructions. For example, corresponding to apparatus 1000, system memory 1003 in an embodiment may comprise any suitable volatile memory.

NVM/memory 1004 may comprise one or more physical, non-temporary, computer-readable media for storing data and/or instructions. For example, NVM/memory 1004 may comprise any suitable non-volatile memory means, such as one or more hard disk drives (HDD), one or more compact disks (CD), and/or one or more digital versatile disks (DVD).

NVM/memory 1004 may comprise storage resources. These storage resources physically are part of a device that is installed on the system or that can be accessed, but they are not necessarily a part of the device. For example, NVM/memory 1004 may be accessed by a network via network interface 1006.

System memory 1003 and NVM/memory 1004 may each include temporary or permanent copies of instructions 1010. Instructions 1010 may include instructions that, when executed by at least one of processor(s) 1002, cause one or a combination of the methods described in FIGS. 3, 5, and 6 to be implemented by device 1000. In each embodiment, instructions 1010 or hardware, firmware, and/or software components may additionally/alternately be put within system control logic 1001, network interface 1006, and/or processor(s) 1002.

Network interface 1006 may include a receiver to provide device 1000 with a wireless interface for communication with one or more networks and/or any suitable device. Network interface 1006 may include any suitable hardware and/or firmware. Network interface 1006 may include multiple antennae to provide multi-input/multi-output wireless interfaces. In an embodiment, network interface 1006 may comprise a network adapter, a wireless network adapter, a telephone modem, and/or a wireless modem.

In an embodiment, at least one of the processor(s) 1002 may be packaged together with the logic of one or more controllers of the system control logic. In an embodiment, at least one of the processors may be packaged together with the logic of one or more controllers of the system control logic to form a system-level package. In an embodiment, at least one of the processors may be integrated together with the logic of one or more controllers of the system control logic in the same chip. In an embodiment, at least one of the processors may be integrated together with the logic of one or more controllers of the system control logic in the same chip to form a system chip.

Device 1000 may further comprise an input/output device 1005. Input/output device 1005 may comprise a user interface (e.g., a display screen) that is for causing interaction between the user and device 1000. It may comprise a peripheral component interface, which is designed to enable peripheral components to interact with the system, and/or it may comprise sensors for determining environmental conditions and/or location information relating to device 1000.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

present, at a display, a first composition including a sub-graphics layer object associated with a graphical interface corresponding to an application, wherein the application is executed in a guest subsystem of the system;

receive a content-related compositing request corresponding to a guest server graphics layer object in the guest subsystem, wherein the guest server graphics layer object corresponds to the sub-graphics layer object;

use the guest server graphics layer object to obtain a host server graphics layer object that corresponds to the guest server graphics layer object, wherein the host server graphics layer object is in a host subsystem of the system, wherein the host server graphics layer object is configured to obtain window status data stored in the host subsystem, wherein the window status data includes control information with respect to the graphical interface, wherein the control information includes at least one of size information and position information;

obtain a buffer corresponding to the guest server graphics layer object, wherein the buffer is located in the guest subsystem, wherein the buffer stores graphical interface content data corresponding to the graphical interface; and generate a second composition including to:

generate an updated graphical interface associated with the sub-graphics layer object based at least in part on the content-related compositing request, the graphical interface content data stored in the buffer in the guest subsystem, and the window status data obtained by the host server graphics layer object in the host subsystem; and merge the updated graphical interface associated with the sub-graphics layer object with at least one other graphical interface, wherein the second composition is to be presented at the display; and one or more memories coupled to the one or more processors and configured to provide instructions to the one or more processors.

2. The system of claim 1, wherein the host subsystem comprises a first type of operating system and the guest subsystem comprises a second type of operating system, wherein the first type of operating system is different from the second type of operating system.

3. The system of claim 1, wherein the one or more processors are configured to:

in response to an indication that the application has started, generate a host client in the host subsystem and a guest client in the guest subsystem.

4. The system of claim 3, wherein the guest client is configured to create the buffer corresponding to the guest server graphics layer object.

5. The system of claim 3, wherein the one or more processors are configured to:

receive, from the host client, a first instruction to create the host server graphics layer object corresponding to the sub-graphics layer object;

in response to the first instruction, generate the host server graphics layer object in the host subsystem;

receive, from the guest client, a second instruction to create the guest server graphics layer object corresponding to the sub-graphics layer object, wherein the second instruction is sent by the guest client in response to a notification from the host client;

in response to the second instruction, generate the guest server graphics layer object in the guest subsystem; and establish an association between the host server graphics layer object in the host subsystem and the guest server graphics layer object in the guest subsystem.

6. The system of claim 5, wherein to establish the association between the host server graphics layer object in the host subsystem and the guest server graphics layer object in the guest subsystem includes to cause the host server graphics layer object in the host subsystem and the guest server graphics layer object in the guest subsystem to share a name associated with the sub-graphics layer object.

7. The system of claim 5, wherein the host client is configured to cause a host client graphics layer object to be generated, and wherein the second instruction instructs the host server graphics layer object to correspond to the host client graphics layer object.

8. The system of claim 5, wherein the guest client is configured to cause a guest client graphics layer object to be generated, and wherein the first instruction instructs the guest server graphics layer object to correspond to the guest client graphics layer object.

9. The system of claim 1, wherein the one or more processors are further configured to:

receive a window status-related compositing request corresponding to the host server graphics layer object; and generate a third composition including the sub-graphics layer object based at least in part on the window status-related compositing request and the window status data obtained by the host server graphics layer object, wherein the third composition is to be presented at the display.

10. The system of claim 1, wherein to generate the second composition is determined based at least in part on a z-coordinate associated with the sub-graphics layer object.

11. The system of claim 1, wherein the content-related compositing request is generated in response to a user input operation with respect to the graphical interface of the application.

12. A method, comprising:

presenting, at a display, a first composition including a sub-graphics layer object associated with a graphical interface corresponding to an application, wherein the application is executed in a guest subsystem of a system;

receiving a content-related compositing request corresponding to a guest server graphics layer object in the guest subsystem, wherein the guest server graphics layer object corresponds to the sub-graphics layer object;

using the guest server graphics layer object to obtain a host server graphics layer object that corresponds to the guest server graphics layer object, wherein the host server graphics layer object is in a host subsystem of the system, wherein the host server graphics layer object is configured to obtain window status data stored in the host subsystem, wherein the window status data includes control information with respect to the graphical interface, wherein the control information includes at least one of size information and position information;

obtaining a buffer corresponding to the guest server graphics layer object, wherein the buffer is located in the guest subsystem, wherein the buffer stores graphical interface content data corresponding to the graphical interface; and generating a second composition including:

generating an updated graphical interface associated with the sub-graphics layer object based at least in part on the content-related compositing request, the graphical interface content data stored in the buffer in the guest subsystem, and the window status data obtained by the host server graphics layer object in the host subsystem; and merging the updated graphical interface associated with the sub-graphics layer object with at least one other graphical interface, wherein the second composition is to be presented at the display.

13. The method of claim 12, further comprising:

in response to an indication that the application has started, generating a host client in the host subsystem and a guest client in the guest subsystem.

14. The method of claim 13, wherein the guest client is configured to create the buffer corresponding to the guest server graphics layer object.

15. The method of claim 13, further comprising:

receiving, from the host client, a first instruction to create the host server graphics layer object corresponding to the sub-graphics layer object;

in response to the first instruction, generating the host server graphics layer object in the host subsystem;

receiving, from the guest client, a second instruction to create the guest server graphics layer object corresponding to the sub-graphics layer object, wherein the second instruction is sent by the guest client in response to a notification from the host client;

in response to the second instruction, generating the guest server graphics layer object in the guest subsystem; and establishing an association between the host server graphics layer object in the host subsystem and the guest server graphics layer object in the guest subsystem.

16. The method of claim 15, wherein establishing the association between the host server graphics layer object in the host subsystem and the guest server graphics layer object in the guest subsystem includes causing the host server graphics layer object in the host subsystem and the guest server graphics layer object in the guest subsystem to share a name associated with the sub-graphics layer object.

17. The method of claim 15, wherein the host client is configured to cause a host client graphics layer object to be generated, and wherein the second instruction instructs the host server graphics layer object to correspond to the host client graphics layer object.

18. The method of claim 12, further comprising:

receiving a window status-related compositing request corresponding to the host server graphics layer object; and generating a third composition including the sub-graphics layer object based at least in part on the window status-related compositing request and the window status data obtained by the host server graphics layer object, wherein the third composition is to be presented at the display.

19. A computer program product, the computer program product being embodied in a non-transitory computer readable storage medium and comprising computer instructions for:

presenting, at a display, a first composition including a sub-graphics layer object associated with a graphical interface corresponding to an application, wherein the application is executed in a guest subsystem of a system;

receiving a content-related compositing request corresponding to a guest server graphics layer object in the guest subsystem, wherein the guest server graphics layer object corresponds to the sub-graphics layer object;

using the guest server graphics layer object to obtain a host server graphics layer object that corresponds to the guest server graphics layer object, wherein the host server graphics layer object is in a host subsystem of the system, wherein the host server graphics layer object is configured to obtain window status data stored in the host subsystem, wherein the window status data includes control information with respect to the graphical interface, wherein the control information includes at least one of size information and position information;

obtaining a buffer corresponding to the guest server graphics layer object, wherein the buffer is located in the guest subsystem, wherein the buffer stores graphical interface content data corresponding to the graphical interface; and generating a second composition including:

generating an updated graphical interface associated with the sub-graphics layer object based at least in part on the content-related compositing request, the graphical interface content data stored in the buffer in the guest subsystem, and the window status data obtained by the host server graphics layer object in the host subsystem; and merging the updated graphical interface associated with the sub-graphics layer object with at least one other graphical interface, wherein the second composition is to be presented at the display.

* * * * *